Sept. 8, 1953  G. B. R. FEILDEN  2,651,492
TURBINE
Filed March 14, 1947  3 Sheets-Sheet 1
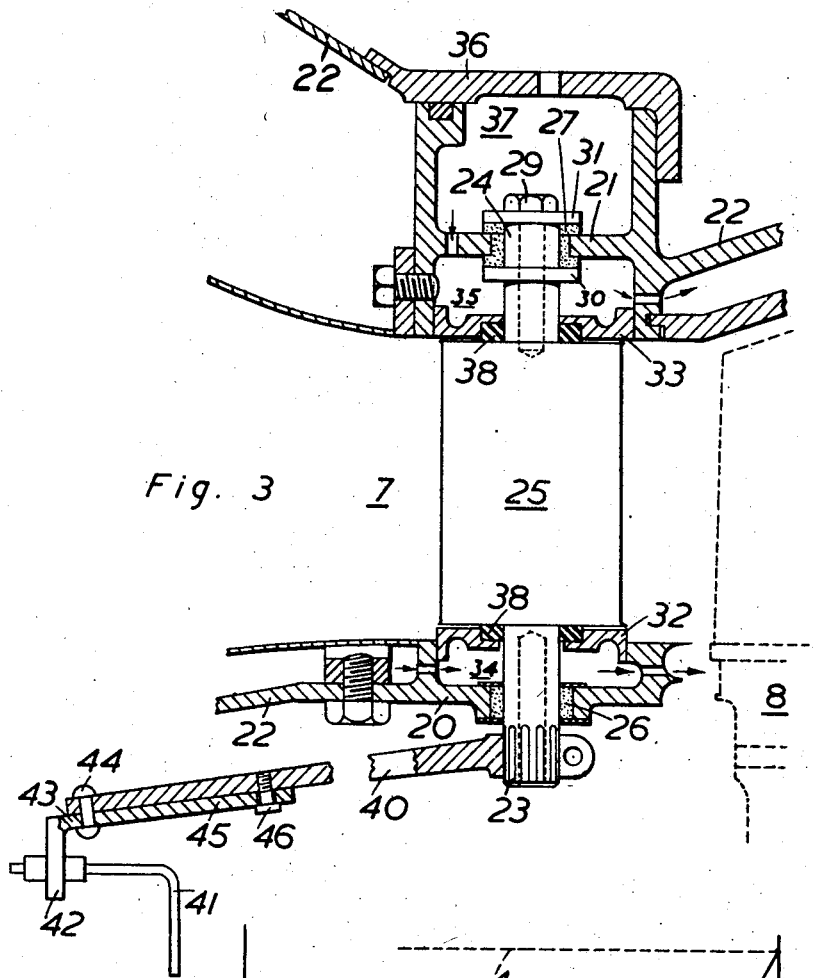
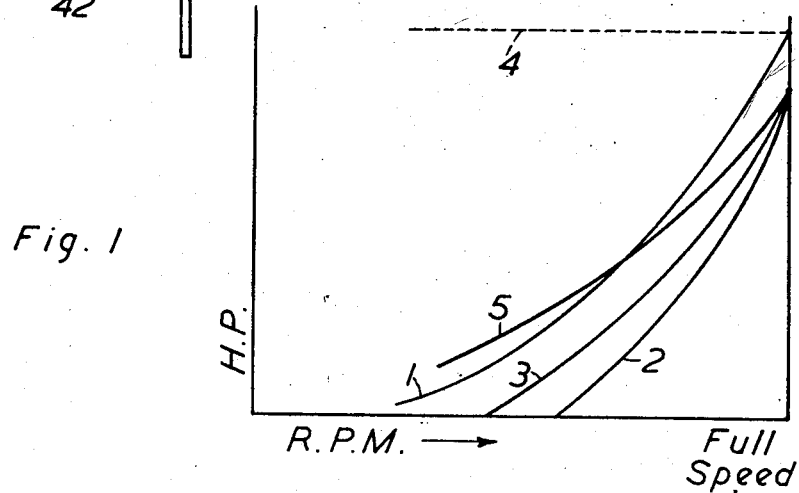
Inventor
Geoffrey Bertram Robert Feilden
By
Stevens, Davis & Miller
his Attorneys

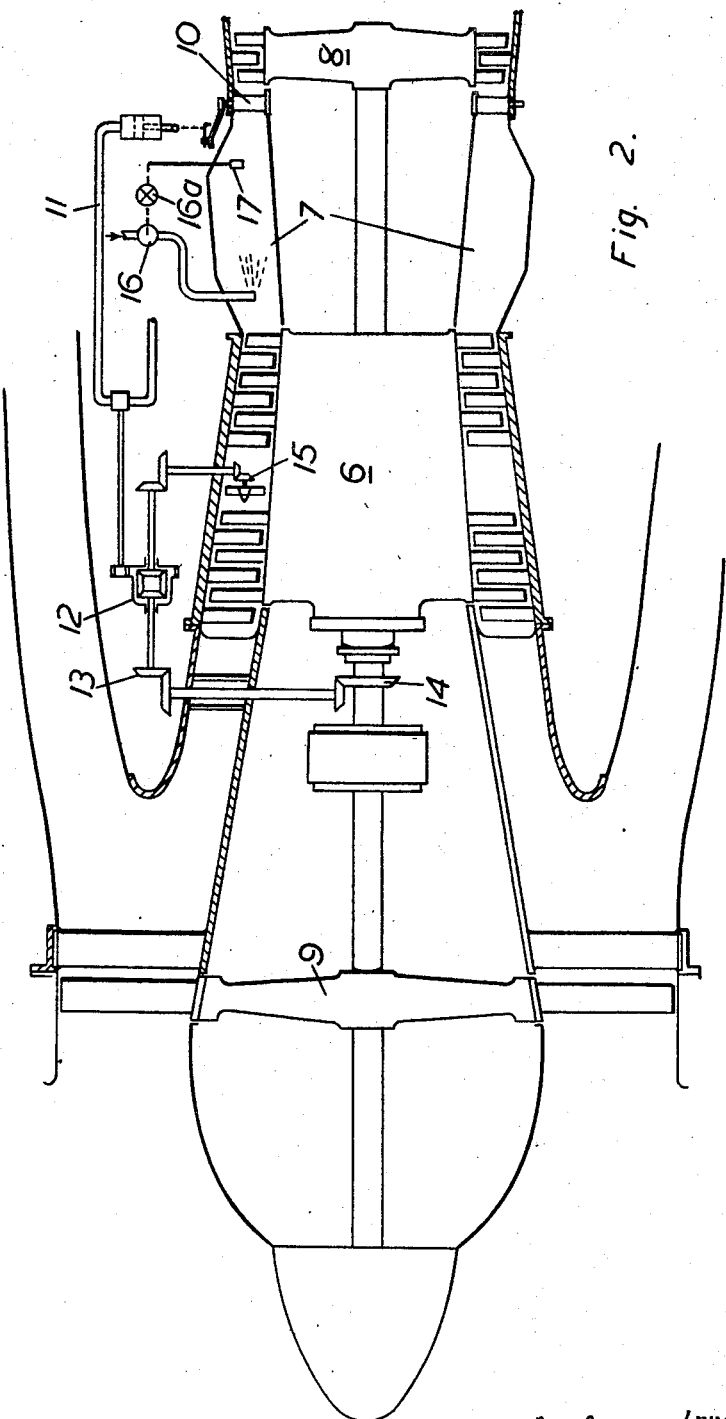

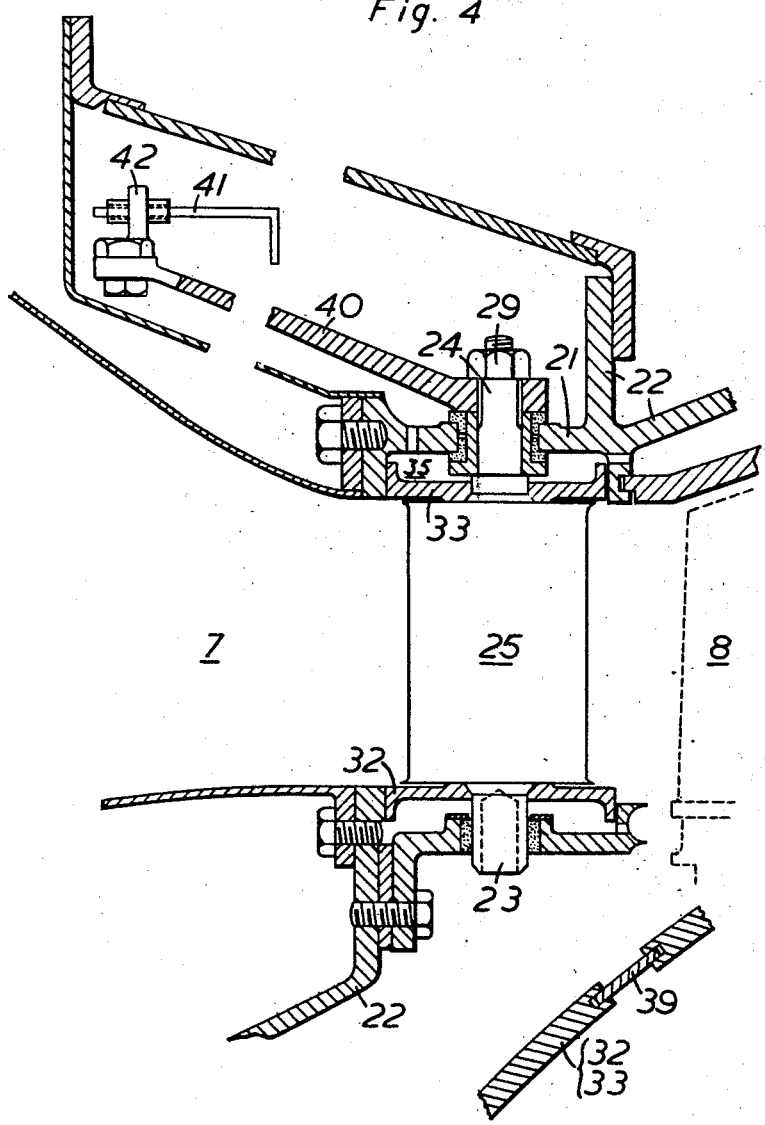

Patented Sept. 8, 1953

2,651,492

UNITED STATES PATENT OFFICE 2,651,492

TURBINE

Geoffrey Bertram Robert Feilden, Lincoln, England, assignor to Power Jets (Research and Development) Limited, London, England, a British company Application March 14, 1947, Serial No. 734,594
In Great Britain March 20, 1946

5 Claims. (Cl. 253—39.1)

This invention relates to turbines and whilst in certain constructional aspects it is of more general application, it has particular value and utility in relation to gas turbine power plant of variable speed of the kind which drives both a compressor supplying working fluid to the plant, and a further power-absorbing unit, particularly one having a fixed horse power/speed characteristic. More specifically stated, the invention is of particular value and utility in controlling aircraft gas turbine power plant of variable speed which, as well as driving a compressor is also required to drive an airscrew or a ducted fan and, may be, to provide a propulsive jet.

It can be shown that when an open cycle gas turbine is operating at less than its full rated speed both the output efficiency and the maximum turbine temperature may be reduced as compared with the efficiency and temperature at full speed, and it is an object of the invention to improve output at speeds below the maximum. The invention is based on the realisation that under such partial load conditions the output may be improved by increasing the maximum turbine temperature to its maximum permissible value, and also that if a compressor is used the mass flow therethrough should be such as to give maximum compressor efficiency for the speed of rotation in question. The turbine temperature can be increased by supplying more fuel for combustion, but whilst such an arrangement has proved adequate in the case of a simple jet-propulsion power plant, if the air flow through the compressor is kept below its optimum value for the prevailing rotational speed due to increased fuel supply necessitated by the presence of a load, such as a propeller or a ducted fan, having a fixed or insufficiently variable horse power/speed characteristic, there may not be any resulting increase in the overall output of the plant, due to surging or other effects in the system arising from a deficient air mass flow, certain axial flow types of compressor being particularly sensitive in this respect. Furthermore, when the plant is required to drive a power-absorbing unit having a fixed horse power/speed characteristic, experience has shown that the power output of the turbine at less than its full rated speed may not be sufficient to drive the power-absorbing unit. If, in such circumstances, it is sought to attain stability by reducing the power absorption of the unit (for example, by varying blade pitch or, in the case of a ducted fan, by providing for variable pre-whirl of the entering fluid) stability may in fact be attained but the efficiency is likely to be lower than at full power. Moreover, in some cases, such as that of a ducted fan, only a small variation in the power absorption may be practicable.

Figure 1 is a graph plotting horsepower against revolutions per minute;

Figure 2 is a longitudinal sectional view of an aircraft gas turbine power unit constructed in accordance with this invention;

Figure 3 is a fragmentary longitudinal sectional view of a portion of Figure 2 showing one embodiment of the invention;

Figure 4 is also a fragmentary longitudinal sectional view of a portion of Figure 2 showing another embodiment of the invention; and Figure 5 is a longitudinal sectional view of an expansion joint constructed in accordance with this invention.

The situation intended to be dealt with by the invention in its control as opposed to its contructional aspect will be more readily understood by reference to Figure 1 of the accompany drawings in which power and temperature are plotted against speed, and in which curve 1 represents a possible variation of turbine temperature with speed, given fixed turbine admission; curve 2 similarly represents engine horse power variation with fixed admission and curve 3 the variation in the power absorption of an element of fixed horse power/speed characteristic which exceeds the power available below design speed.

In order to meet the difficulties described in the foregoing the present invention contemplates the control of turbine temperature by varying the turbine admission in correspondence with the compressor mass flow so as to maintain a high turbine temperature and also an admission suited to the compressor mass flow under varying conditions, the arrangement, according to a further feature of the invention, preferably being such that at all times total admission is maintained; that is to say, the distribution of the fluid admission around the periphery of the turbine always remains the same. By this means, in conjunction with appropriate adjustment of the fuel supply, it becomes possible in the case of gas turbines of the kinds referred to, to vary the turbine temperature at will, so that this temperature may be kept at a constant maximum permissible value at all turbine speeds, as indicated by line 4 in Figure 1, or at least may be maintained nearer to this value than would otherwise be the case, with a consequent improvement in the power output of the turbine at speeds below the maximum such as is indicated by the engine power curve 5, Figure 1, and whilst taking account of the accompanying modification of the compressor air mass flow so as to avoid complications in relation to the compressor.

An arrangement whereby the control may take place entirely automatically is illustrated diagrammatically in Figure 2 as applied to an aircraft gas turbine power unit comprising an axial flow type of compressor 6 supplying air by way of a combustion system 7 to a turbine 8 which drives the compressor 6 and also (for example) a ducted fan type propulsion element 9, the exhaust of the turbine being in this case considered as affording a propulsive jet, although the invention may be applied irrespectively of whether the turbine exhaust or the ducted fan, or both, are used to afford a propulsive jet. In accordance with the invention the turbine 8 has a variable admission nozzle 10 operable to vary the admission by, say, an oil pressure system 11 of any convenient kind, the supply to which is controlled by movement of the output element 12 of a differential gear, one of whose input elements 13 is driven from the compressor shaft by mechanical gearing indicated at 14 and the other from an anemometer 15 operated by the air flow through the compressor. By appropriate selection of gear ratios it can be arranged that there will be resultant movement of the differential output element 12 only when the compressor is operating off its designed speed/flow ratio, under which conditions appropriate adjustment of the turbine admission will be effected. At the same time, the fuel supply 16 is controlled from a thermostat 17 in the hot gas flow giving a measure of the turbine inlet temperature and acting to increase the supply of fuel with a fall of temperature, the fuel supply having a manual overriding control indicated at 16a.

In accordance with a further feature of the invention variation in the turbine admission is obtained by the use of a nozzle ring having guide blades individually adjustable to vary the cross section of the intervening admission passages; for example such guide blades may be pivotally mounted for rotation about axes extending radially of the nozzle ring.

In achieving a satisfactory blade mounting there are a number of problems arising out of the high temperatures at which the turbine admission takes place; further constructional features of the invention designed to offer a solution to these problems, but incidentally of wider application, will appear from the following description, given by way of example, of the practical constructional embodiments of a variable admission nozzle ring illustrated in axial section in Figures 3, 4 and 5 in which it is assumed that the invention is applied to an aircraft gas turbine power plant of the general form illustrated in Figure 2 and comprising an air compressor (not seen in Figures 3 and 4) discharging into a combustion chamber 7 from which the combustion products pass by way of a bladed nozzle ring to an axial flow turbine 8.

In the construction proposed, the nozzle assembly comprises rigid and relatively substantial concentric blade-supporting rings 20, 21 attached to or forming part of the main structure 22 of the plant and each having radially aligned holes to receive inner and outer pivot pins 23, 24 of the blades 25. The latter are of the usual or desired aerofoil cross section to afford between them admission throats of varying cross section and each has at its radially inner end a spigot 23 which is pivotally located in the corresponding hole of the inner supporting ring 20 by means of a carbon bush 26 in order to avoid the need for normal lubrication. The outer ends of the blades are similarly pivoted in carbon bushes 27, except that in this case, for assembly reasons, the spigot 28 is detachably secured to the blade by a screw 29 passing axially through the spigot and accessible from outside the supporting ring 21, whilst the spigot has on the radially inner side of said ring 21 a locating shoulder 30 and is further positively located in the radial sense by a shoulder 31 at its radially outer end formed by an oversize washer element held in position by the spigot holding screw 29.

The respective blade-supporting rings 20, 21 are, in general, of channel form, with their open sides presented to the gas stream, and shrouding 32, 33 is provided across these open sides to define the inner and outer walls of the nozzle between which the guide blades extend. This shrouding also serves, in conjunction with the respective channel form rings, to define annular chambers 34, 35 enclosing the root ends of the inner and outer spigots, which chambers are placed in communication with a supply of cooling air or fluid to provide a flow of coolant therethrough as indicated by the arrows. Similarly, an outer casing 36 may define with the outer blade supporting ring 21 a further annular chamber 37 enclosing the radially outer ends of the outer spigots 24 and having provision for a flow of coolant therethrough. By means of this arrangement the supporting rings 20, 21 and the pivots of the guide blades can be kept at a relatively low temperature. The blades 25 themselves and the shrouding 32, 33 of course, must operate at the maximum turbine temperature and in order to prevent binding between these parts the shrouding, in the first place, is provided with inset ceramic washers 38 designed to maintain an appropriate clearance between it and the blades, and in the second place is constructed of a plurality of peripherally extending segments interconnected by expansion joints which are adapted to permit the segments of the shroud to expand and contract without variation of its diameter. In practice the shrouds 32, 33, being in effect attached to the blades by the passage of the spigots 23, 24 therethrough, have their diameters determined by that of the blades and the blade-supporting rings, so that notwithstanding expansion and contraction of the latter the blade clearance remains constant. As illustrated in the scrap view of Figure 5, the expansion joints may be provided by thin metal strips 39 entering slots in the adjacent ends of pairs of shroud segments 32, 33 sufficient end-clearance being left in the slots to accommodate the expansion of these segments.

In order to allow control of the blade setting as required, the inner spigot 23 of each blade has attached thereto a lever arm 40 extending axially of the turbine and co-operating at its free end with an adjuster ring 41 mounted for rotation about the turbine axis, adjustment of the ring effecting rotation of all the nozzle blades 25 about their radial pivots and thus, by reason of the normal differential shaping of the adjacent blade surfaces, varying the admission area of the individual nozzle throats. Preferably the blade-operating lever arms 40 should be as long as practicable to minimise the effect of any play that might develop in the blade bearings.

The control mechanism may also include provision for individual adjustment of the blade settings, and this may take the form of an adjustable connection between the blade-operating lever arms 40 and the adjuster ring 41. Thus, each said connection may be afforded by a radially extending finger 42 whose free end engages a socket in the adjuster ring 41 and which is mounted on the shorter arm 43 of a blade-setting lever pivoted at 44 on the associated blade-operating lever arm 40, the longer arm 45 of said blade setting lever being associated with a locking nut 46 or other means by which the setting lever may be locked in any of a plurality of positions.

The construction illustrated in Figure 4 is generally similar to that illustrated in Figures 3 and 5, and differs therefrom mainly in the omission of the ceramic washers 38, the clearance from the shroud being afforded by raised parts of the latter; the application of the lever arms 40 to the outer ends of the blades; and the use of a less sensitive form of individual adjustment for the blades, which in this case employs an eccentric rotatably adjustable arrangement of the pin 42 engaging the adjuster ring 41.

Whilst the control aspect of the invention has been considered primarily with reference to its applications to a particular class of gas turbine power plant, it will be appreciated that the constructional features of the variable admission nozzle described are applicable to other classes of turbine, including steam turbines, in which it may be desired to provide variable admission.

The type of control made possible by the invention is considered to have application to gas turbines of the kind referred to employing complex cycles in which the working gas operates a plurality of turbines. In this case, it becomes possible to regulate the power output of the constituent turbines without producing undesirable disturbance of the compressor flow.

I claim:

1. In a gas turbine plant having a bladed turbine rotor for receiving hot working fluid to drive it, the combination of a turbine working fluid inlet casing defining the walls of an admission nozzle through which the hot working fluid passes to said bladed turbine rotor, a plurality of adjustable guide blades disposed in spaced relationship in said inlet casing between said walls, each having pivot support means about which it turns for adjustment, a plurality of bearing means for said pivot support means formed in said inlet nozzle casing, and shrouding members having holes therein to accommodate said blade pivot supports arranged in said inlet nozzle casing co-extensive with said walls and spaced away therefrom adjacent said blades to form an insulating gap between said blades and said casing walls to protect said walls, said blade pivot support means and said bearing means from said hot working fluid.

2. In a gas turbine plant having a bladed turbine rotor for receiving hot working fluid to drive it, the combination of a turbine working fluid inlet casing defining the walls of an admission nozzle through which the hot working fluid passes to said bladed turbine rotor, a plurality of adjustable guide blades disposed in spaced relationship in said inlet casing between said walls, each having a supporting pivot about which it turns for adjustment, a plurality of pivot bearings one for each said blade formed in a wall, and a shrouding member having holes equal in number to the number of said blade pivots to accommodate them arranged in said inlet casing, co-extensive with said pivot bearing wall and spaced away therefrom adjacent said blades to form an insulating gap between said blades and said casing wall to protect it, said blade pivots and said pivot bearings from said hot working fluid.

3. In a gas turbine plant having a bladed turbine rotor for receiving hot working fluid to drive it, the combination of a turbine working fluid inlet casing defining the walls of an annular admission nozzle through which the hot working fluid passes to said bladed turbine rotor, a plurality of adjustable guide blades disposed in uniformly spaced relationship within said annular inlet casing between said walls, each having a supporting pivot for turning on a radial axis of said annular inlet, a plurality of pivot bearings in each said wall radially disposed for said pivots and a shrouding ring having holes for said radial pivots arranged in said inlet casing co-extensive with said pivot bearing wall and spaced away therefrom adjacent said blades to form an annular insulating gap between said blades and said casing wall to protect it, said blade pivots and said pivot bearings from said hot working fluid.

4. In a gas turbine plant having a bladed turbine rotor for receiving hot working fluid to drive it, the combination of a turbine working fluid inlet casing defining the walls of an annular admission nozzle through which the hot working fluid passes to said bladed turbine rotor, a plurality of adjustable guide blades disposed in uniformly spaced relationship within said annular inlet casing between said walls each having supporting pivots for turning on a radial axis of said annular inlet, a plurality of pivot bearings in each said wall radially disposed to receive said supporting pivots and a pair of shrouding rings each having holes for said radial pivots, arranged in said annular inlet casing, co-extensive with said walls and spaced away therefrom adjacent said blades to form annular insulating gaps between said blades and said casing walls to protect them, said blade pivots and said pivot bearings from said hot working fluid.

5. In a gas turbine plant having a bladed turbine rotor for receiving hot working fluid to drive it, the combination of a turbine working fluid inlet casing defining the walls of an annular admission nozzle through which the hot working fluid passes to said bladed turbine rotor, a plurality of adjustable guide blades disposed in uniformly spaced relationship within said annular inlet casing between said walls, each having supporting pivots for turning on a radial axis of said annular inlet, a plurality of pivot bearings in each said wall radially disposed to receive said supporting pivots, a pair of shrouding rings each having holes for said radial pivots, arranged in said inlet casing co-extensive with said inlet walls and spaced away therefrom adjacent said blades to form annular insulating gaps between said blades and said casing walls to protect them, said blade pivots and said pivot bearings from said hot working fluid and a plurality of heat resistant bushes for said pivot bearings and said holes through said shrouding rings to support said adjustable guide blades for turning without lubrication in said hot working fluid.

GEOFFREY BERTRAM ROBERT FEILDEN.

References Cited in the file of this patent

UNITED STATES PATENTS

| Number | Name | Date |
|---|---|---|
| 1,021,226 | Wilkinson | May 26, 1912 |
| 1,842,957 | Bassler | Jan. 26, 1932 |
| 1,928,504 | Schaper | Sept. 26, 1933 |
| 2,100,489 | Richardson | Nov. 30, 1937 |
| 2,219,994 | Jung | Oct. 29, 1940 |
| 2,312,605 | Traupel | Mar. 2, 1943 |
| 2,337,861 | Adamtchik | Dec. 28, 1943 |
| 2,351,328 | Gent | June 13, 1946 |
| 2,428,830 | Birmann | Oct. 14, 1947 |
| 2,460,778 | Willgoos | Feb. 1, 1949 |
| 2,472,062 | Boestad | June 7, 1949 |